United States Patent

[11] 3,583,637

| [72] | Inventor | John A. Miscovich<br>Flat, Alaska |
|---|---|---|
| [21] | Appl. No. | 815,757 |
| [22] | Filed | Apr. 14, 1969 |
| [45] | Patented | June 8, 1971 |
| [73] | Assignee | Stang Hydronics Inc.<br>Orange, Calif. |

[54] AIRPORT RUNWAY FIRE-FIGHTING SYSTEM AND APPARATUS
5 Claims, 3 Drawing Figs.

[52] U.S. Cl. .................................................... 239/203,
169/2, 239/587, 244/114
[51] Int. Cl. ........................................................ A62c 35/00
[50] Field of Search ........................................... 239/201,
202, 203, 206, 207, 587; 169/1, 2, 5, 14, 15, 16,
17, 25; 244/114

[56] References Cited
UNITED STATES PATENTS
1,337,744  4/1920  Ballerstedt ................... 239/203

| 2,097,908 | 11/1937 | Allen | 239/204X |
|---|---|---|---|
| 2,983,451 | 5/1961 | Ramsey | 239/203 |
| 3,010,519 | 11/1961 | Gillespie | 169/25 |
| 3,346,052 | 10/1967 | Moore et al. | 169/25 |

Primary Examiner—M. Henson Wood, Jr.
Assistant Examiner—Michael Y. Mar
Attorney—Gausewitz & Carr ABSTRACT: A remote controlled fire-fighting apparatus which remains completely below the ground surface when not in use. When the apparatus is to be used, a hatch covering the unit is opened and the nozzle raised to its operating position. The discharge nozzle can then be rotated in horizontal and/or vertical planes and directed at the source of the fire. After the fire has been extinguished, the apparatus is retracted into its underground housing and the hatch above it replaced. Numerous units of the apparatus are disposed along the runway and are remote controlled to form an integrated fire-fighting system.

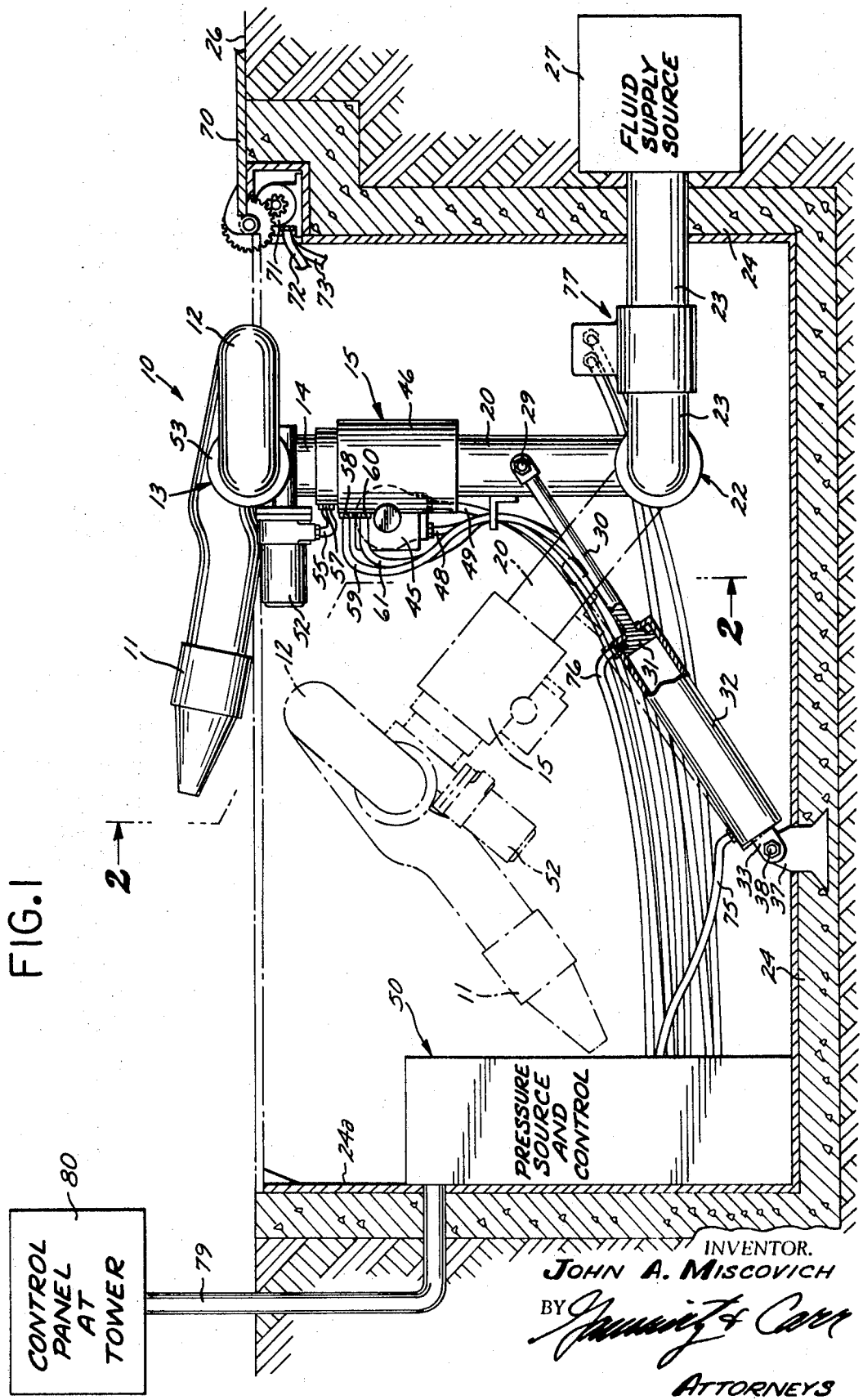

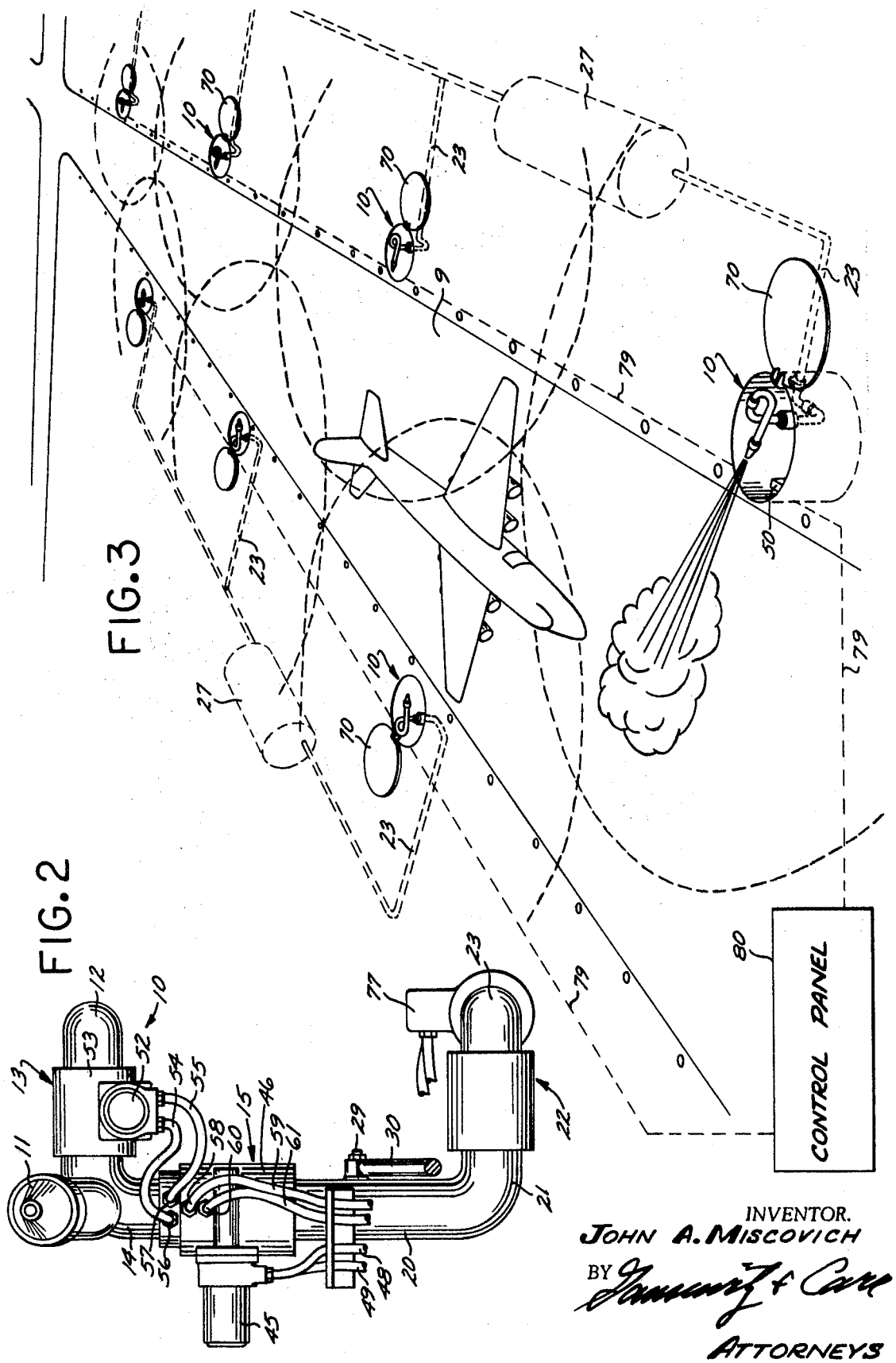

3,583,637

AIRPORT RUNWAY FIRE-FIGHTING SYSTEM AND APPARATUS

BACKGROUND OF THE INVENTION

1. Field of the Invention

This invention relates to the field of remote controlled airport runway fire protection systems and the like.

2. Description of the Prior Art

Airport runways, whether on land or at sea (on an aircraft carrier), present constant fire hazards. It is not unusual for an airplane to make a landing without benefit of operating landing gear. When this occurs, foam is usually spread on the runway by tank trucks or fire trucks. Such prior methods of fire fighting at airports have proved to be disadvantageous for numerous reasons, one being that trucks can carry only limited amounts of foam. Furthermore, since airplane crashes or collisions usually occur without advance warning, the fire trucks are not always prepared when the emergency arises. Even if both the crew and the machinery are prepared, they must travel from their base to the point of the crash or collision, which travel may take a matter of minutes. This delay can be extremely critical and result in extensive fire damage and loss of life. Even when advance warning is given, as when an airplane is landing without operating landing gear, the fire trucks cannot move too close to the runway because they present a dangerous obstacle to the safe landing of the aircraft.

The use of water- or foam-carrying fire trucks has also proved to be expensive, because they must be manned at all times even though they may be used only a few times in emergencies. The high purchase price of the mobile fire-fighting equipment, added to the repair and replacement costs of the equipment as it becomes obsolete, makes uneconomic the use of mobile fire protection systems for airports.

Stationary fire-fighting apparatus can be positioned near some areas of high fire danger, but it is impractical to place such apparatus above ground and near aircraft runways. Safety requires that the areas adjacent airport runways be completely free of obstructions that might cause damage to moving airplanes. Prior art below-ground sprinkler apparatus is shown in such U.S. Pat. Nos. as 1,337,774; 2,989,247; and 3,063,645, but such apparatus is not capable of blanketing an airport runway with foam, etc., or directing large volumes of water or other liquid to critical areas. Fire-fighting systems have been used for airplane hangars (U.S. Pat. Nos. 1,826,072; 2,059,190; and 2,196,592), remote-operated fire-fighting nozzles are known (U.S. Pat. Nos. 2,729,295; 2,834,416; 3,010,519; and 3,106,249), but the prior art has not heretofore provided any safe, practical and effective fire-fighting system for airport runways.

SUMMARY OF THE INVENTION

In accordance with the present invention, a substantial number of large hydraulic monitors are mounted below ground at spaced locations adjacent and along the airport runway. Each monitor is effectively remote controlled, as by a single operator at the control tower. The monitors are housed on open-topped foundations or boxes which are covered with remote-operated hatch covers. The constructions are such that no dangerous obstacles are presented to airplanes, even when the monitors are elevated to operative positions.

In a preferred form of the present invention, three power-operated swivel joints are incorporated into a remote-controlled hydraulic monitor and fire-fighting apparatus. Two of the swivel joints cooperate to allow the nozzle on the hydraulic monitor to rotate in either horizontal or vertical planes, thereby allowing the monitor to discharge fire-fighting fluid to any point in its vicinity. The third swivel joint allows the hydraulic monitor to be pivoted to a position completely below the ground surface, when not in use, in order to permit covering of the monitor and prevent it from being an obstacle to landing airplanes.

BRIEF DESCRIPTION OF THE DRAWINGS

FIG. 1 is a side elevational view of the fire-fighting apparatus, showing the same in both retracted and operating positions;

FIG. 2 is a frontal elevational view of the apparatus; and

FIG. 3 is a perspective view of an airport runway which incorporates the apparatus.

DESCRIPTION OF THE PREFERRED EMBODIMENT

Stated generally, and referring to FIG. 3, the present invention comprises mounting adjacent an aircraft runway 9 a plurality of remote-controlled hydraulic monitors 10. The monitors are always beneath the ground when not in use, but are rapidly elevated to the illustrated operative positions.

Each of the monitors 10 is, as shown in FIGS. 1 and 2, comprised of a nozzle 11 (either a jet nozzle or a fog nozzle) which is rigidly attached to an intermediate or loop section 12. Referring to FIG. 2, loop section 12 is associated with a horizontal swivel joint 13 which pivotally connects the loop section 12 to a 90° elbow member 14. A second and vertical swivel joint 15 pivotally connects the elbow member 14 to a tubular shank or stem member 20. The axis of swivel joint 13 preferably intersects that of swivel joint 15. When shank member 20 is vertical, swivel joint 13 allows the nozzle 11 to pivot in a vertical plane while swivel joint 15 allows the nozzle 11 to pivot horizontally.

Shank member 20, as best shown in FIG. 2, has a 90° elbow section 21 on its lower end. Elbow section 21 is associated with a third and horizontal swivel joint 22 which pivotally connects the shank member 20 to a fluid supply pipe or conduit 23. The fluid supply pipe 23 is rigidly attached to a foundation 24 and is connected to an appropriate fluid supply source 27. Suitable pumps, not shown, are incorporated in lines 23 between supply sources 27 and the respective monitors.

The foundation 24 may be a box formed of concrete and embedded below the ground surface 26 as illustrated. The concrete may, if desired, be faced by corrosion-resistant metal as shown at 24a.

Pivotally attached to a bracket 29, which is positioned on the side of shank member 20, is a rod 30 which is rigidly connected to a piston 31 in a cylinder or casing 32. Attached to the lower end of cylinder 32 is a bracket 33 which is pivotally attached to a support or pivot member 37 by means of pin 38 as shown in FIG. 1. The support member 37 is rigidly embedded in the foundation 24.

Parts 11 through 15 of the above-described hydraulic monitor 10 illustrated in FIGS. 1 and 2 are similar to the hydraulic monitors disclosed and claimed in Miscovich U.S. Pat. Nos. 2,612,402; 2,680,650; and 2,998,199. It is to be understood, however, that the present invention is applicable to any other type of hydraulic monitor and is not limited to use only with the hydraulic monitors disclosed in such Miscovich patents.

The swivel joints 13 and 15 and the power means to operate them, hereinafter briefly described, are the same as the improved power-operated swivel joint means disclosed and claimed in copending U.S. Pat. application Ser. No. 755,919, filed Aug. 28, 1968, for an Improved Power-Operated and Manually Operated Swivel-Joint Means, and Hydraulic Monitor Incorporating the Same, Inventor Leondras A. Warren.

The horizontal movement of nozzle 11 is controlled by a rotary fluid motor 45 which is positioned on the outer casing 46 of swivel joint 15. The motor 45 includes a worm which meshes with a worm wheel positioned on the portion of elbow section 14 which is received in casing 46. Connected to motor 45 are fluid conduits 48 and 49 leading to a fluid pressure and fluid control source 50. When it is desired that the motor 45 be operated, fluid is introduced into conduit 48 and withdrawn through conduit 49. When it is desired that motor 45 be operated in a reverse direction fluid is introduced into the motor through conduit 49 and drained through conduit 48.

A rotary fluid motor 52 is positioned on the outer casing 53 of swivel joint 13, the casing 53 being rigidly attached to the upper cylindrical portion of elbow section 14. Fluid conduits 54 and 55 connect to motor 52, and are attached at the lower exposed portion of elbow section 14 to fittings 56 and 57, respectively. Extending downwardly from fitting 56, and completely within the walls of elbow section 14, is a passage (not shown) which terminates in and connects with an annular groove formed between elbow section 14 and the outer portion 46 of swivel joint 15. A fitting 58 is positioned adjacent to the above-described annular groove and extends into it, thus connecting a conduit 59 with conduit 54.

A similar passage extends from fitting 57, entirely within the walls of elbow section 14, to an annular groove formed between members 14 and 46. A fitting 60 is positioned adjacent to and extends into such groove, thereby connecting a conduit 61 with conduit 55.

Conduits 59 and 61 are connected to the source 50 of pressure and fluid control. When motor 52 is to be activated, fluid is introduced into one of lines 59 and 61 and drained from the other. If the direction of motor 52 is desired to be reversed, the fluid flow through conduits 59 and 61 is merely reversed.

The above-described swivel joint means for the hydraulic monitor 10 will allow nozzle 11 to be rotated horizontally to any position without tangling or knotting conduits 54 and 55, because the end connections of the conduits 54 and 55 remain fixed relative to one another at all times.

When the hydraulic monitor 10 is not needed, it is positioned as shown in phantom in FIG. 1, with shank 20 inclined to a substantial angle from the vertical. In this position, the entire apparatus is beneath the ground surface 26 and is entirely covered by a pivotally mounted hatch 70. The hydraulic monitor then presents no above-the-ground obstacle to moving vehicles or aircraft that might be landing on or near the runway 9.

When the monitor 10 is to be used, the hatch 70 covering the monitor is swung open by means of a fluid motor 71. Such motor is connected to hatch 70 by suitable gearing shown in FIG. 1. Motor 71 is activated by introducing fluid into a conduit 72 and withdrawing fluid from a conduit 73. After the hatch has been opened, the hydraulic monitor 10 is rotated about swivel joint 22 until shank member 20 is in an upright position. This pivotal movement of the monitor 10 is accomplished by introducing fluid into cylinder 32 through a conduit 75, and draining fluid therefrom through a conduit 76. Such conduits are connected to source and control 50.

A valve 77 in pipe or conduit 23 regulates the amount of fluid flow through the monitor, and is controlled by conduits leading to element 50.

It is a feature of the invention that shank 20 is so short that the upper portions of monitor 10 are only a short distance above ground level 26 (FIG. 1) when the monitor is in the active position shown in solid lines. Therefore, even if a monitor should be struck by an airplane, the engines and wings of the airplane would not be engaged, and damage would be relatively minor.

As shown in FIG. 3, numerous monitors are positioned on either side of the airport runway 9. The monitors are so located that the jets therefrom cover the entire runway 9, as shown in dashed-line circles in FIG. 3. The monitors are positioned entirely beneath the surface of the ground and covered by the hatches 70. The control lines 79 from each monitor extend to a master control panel or board 80 (FIG. 1) preferably situated in the airport control tower. The connections to panel 80 are preferably electrical, and lead to solenoid valves in source 50.

Whenever a crash, or a collision occurs, or a fire breaks out on or near the airport runway 9, the operator in the control tower activates the monitor or monitors 10 near the fire and directs the discharge of each monitor directly onto the source of the fire. After the fire has been extinguished, the operator again returns the monitors 10 to their positions beneath the surface of the ground and replaces the hatches 70.

The present airport runway fire-protection system does not interfere in any way with the normal operations of the airport when the system is not in use. As stated above, even when the monitors 10 are in their upright positions they do not extend high enough above the ground level to contact an aircraft wing. The monitors 10 provide complete fire protection coverage for the runway and areas adjacent to the airport runway at all times. This system eliminates the need for requiring a manned fire engine or fire truck to be maintained at the airports around the clock. It also provides fire protection to a burning aircraft faster than could normally be provided by presently existing means.

Each monitor 10 can discharge water, foam, or any other fire-fighting liquid. It should also be noted that the invention disclosed and claimed in Miscovich U.S. Pat. No. 3,188,009 could be incorporated into the present invention, thus yielding an effective, variable discharge fire-fighting monitor 10. Such Miscovich patent discloses a variable spray nozzle which gives the operator of the monitor 10 a great choice of nozzle selections. The operator can choose to expel a concentrated stream of liquid, a fine mist, or a combination of both.

Each monitor 10 may have numerous fluid supply pipes 23 servicing it. One fluid supply pipe could furnish water while another could furnish a liquid foam material. Still another could supply the monitor with fog-fighting chemicals which could be dispelled into the atmosphere through one of the nozzles on the variable spray nozzle previously disclosed.

When the airport receives word that an airplane must lane with malfunctioning landing gears, foam is spread on the entire runway 9 using only the hydraulic monitors 10 positioned along the runway 9. The control panel 80 includes automatic control devices preset to spray foam only on the airport runway and not on areas adjacent to the runway. After the disabled aircraft has made its final approach to the runway and is beginning to land, the monitors 10 are disengaged from such automatic control devices and are individually controlled by the operator at the master control panel. The automatic spraying of the runway saves the operator's time but still enables him to individually direct the hydraulic monitors 10 at the source of the fire if a fire breaks out after the airplane lands.

After the airplane has landed and the danger of fire is over, the automatic control devices for monitors 10 are reengaged, and effect spraying of the runway with water or another cleansing agent to remove the foam or other debris.

The above-described fire-fighting apparatus is equally as useful on aircraft carriers as it is around land-based airports. The hatches 70 of the hydraulic monitors 10 are positioned on the flight deck of the aircraft carrier itself, or on either side of the flight deck, thereby providing fire protection coverage to the entire runway surface of the aircraft carrier.

The system may be installed above ground at military airports, and may be portable from one airport to another.

I claim:

1. A fire-fighting system for airport runways, which comprises:
    a plurality of hydraulic monitor units disposed at spaced locations along a runway for airplanes,
    said units being so located that jets therefrom blanket said runway with fire-fighting fluid,
    each of said units including a foundation defining a chamber and recessed below the level of the ground,
    each of said units also including a high-volume hydraulic monitor mounted in said chamber and movable between a retracted position recessed below ground level and an operating position at which at least the nozzle of such monitor is disposed above ground level,
    said nozzle being mounted for pivotal movement in both horizontal and vertical planes whereby said nozzle may be directed at the source of a fire on said runway,
    each of said units also including a hatch which is closed over said foundation when said monitor is in said retracted position and is open when said monitor is in said operating position, means to supply fire-fighting fluid to said monitor units, and centrally operated remote-control means connected to all of said monitor units to operate said monitors between said retracted and operating positions, to shift said hatches between said closed and open positions, to direct said nozzles in said horizontal and vertical planes, and to control the supply of fire-fighting fluid to said monitors.

2. The invention as claimed in claim 1, in which the stem pipe for supplying said fire-fighting fluid to each of said monitors is pivoted for movement about a horizontal axis, and in which means are provided for moving each monitor between said retracted position and said operation position by pivoting said stem pipe about said axis, said last-named means being operated by said remote-control means.

3. The invention as claimed in claim 2, in which said stem pipe for each monitor is sufficiently short that the associated nozzle is only a short distance above ground level when such monitor is in operating position, whereby to minimize damage in the event such monitor is contacted by an airplane.

4. The invention as claimed in claim 1, in which each of said monitor units is so constructed that the most elevated part of each monitor is only a short distance above ground level when said monitor is in operating position.

5. The invention as claimed in claim 1, in which motor-operated hydraulic swivel joints are incorporated in each of said monitors to effect said nozzle movement in said horizontal and vertical planes.